US008964790B2

United States Patent
Saito et al.

(10) Patent No.: US 8,964,790 B2
(45) Date of Patent: Feb. 24, 2015

(54) COMMUNICATION APPARATUS (71) Applicant: Fujitsu Limited, Kawasaki-shi (JP)

(72) Inventors: Masaaki Saito, Kawasaki (JP); Kanta Yamamoto, Kokubunnji (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 13/663,885

(22) Filed: Oct. 30, 2012

(65) Prior Publication Data

US 2013/0121347 A1 May 16, 2013

(30) Foreign Application Priority Data

Nov. 16, 2011 (JP) ................................. 2011-251129

(51) Int. Cl.
H04J 3/06 (2006.01)

(52) U.S. Cl.
CPC ............. H04J 3/0697 (2013.01); H04J 3/0667 (2013.01)
USPC ........................................................ 370/503

(58) Field of Classification Search
None
See application file for complete search history.

(56) References Cited

U.S. PATENT DOCUMENTS

| 6,483,825 | B2 | 11/2002 | Seta |
| 7,876,790 | B2* | 1/2011 | Cho et al. ..................... 370/503 |
| 8,249,115 | B2 | 8/2012 | Inomata |
| 8,576,883 | B2* | 11/2013 | Lansdowne ................... 370/503 |
| 8,582,606 | B2* | 11/2013 | Pignatelli ....................... 370/503 |
| 2010/0118895 | A1* | 5/2010 | Radulescu ..................... 370/503 |
| 2011/0249688 | A1* | 10/2011 | Liu ................................ 370/503 |
| 2011/0296226 | A1* | 12/2011 | Sorbara et al. ................ 713/400 |
| 2012/0079310 | A1* | 3/2012 | Matsusue et al. ............. 713/400 |
| 2012/0275501 | A1* | 11/2012 | Rotenstein .................... 375/220 |
| 2012/0300795 | A1* | 11/2012 | Joergensen ................... 370/503 |
| 2013/0039359 | A1* | 2/2013 | Bedrosian .................... 370/350 |

FOREIGN PATENT DOCUMENTS

| JP | 2000-23245 | A | 1/2000 |
| JP | 2001-36538 | A | 2/2001 |
| JP | 2009-65579 | A | 3/2009 |
| JP | 2010-197320 | A | 9/2010 |

* cited by examiner

*Primary Examiner* — Anh-Vu Ly
(74) *Attorney, Agent, or Firm* — Fujitsu Patent Center (57) ABSTRACT

When time synchronization between communication apparatuses is performed with PTP, a PTP packet storing a time stamp is transmitted/received. At that time, an RTC is provided in a PTP packet generation unit within the communication apparatus. An RTC is also provided in a PTP packet transmission unit. These RTCs are time-synchronized by a hardware operation based on PPS/System CLK. The RTCs of the PTP packet generation unit and the PTP packet transmission unit are time-synchronized, whereby a highly precise time stamp and correction value for a time can be obtained.

7 Claims, 13 Drawing Sheets

|  | field | Length (bit) |
|---|---|---|
| General Header (34B) | transportSpecific | 4 |
|  | messageType | 4 |
|  | reserved | 4 |
|  | versionPTP | 4 |
|  | messageLength | 16 |
|  | domainNumber | 8 |
|  | reserved | 8 |
|  | flagField | 16 |
|  | correctionField | 64 |
|  | reserved | 32 |
|  | sourcePortIdentity | 80 |
|  | sequenceID | 16 |
|  | controlFied | 8 |
|  | logMessageInterval | 8 |
| Sync message Specific (10B) | originTimestamp | 80 |

RELATED ART

FIG. 11 ate a reference clock the timing of which is synchronized with the clock signal from the external oscillator. This reference clock is transferred to the Boundary clock mode node 11 and an Ordinary clock mode node 12 by using Synchronous Ethernet. In the Boundary clock mode node 11 and the Ordinary clock mode 12, timings are synchronized by the PLLs 17-2 and 17-3.

COMMUNICATION APPARATUS

CROSS-REFERENCE TO RELATED APPLICATION

This application is based upon and claims the benefit of priority of the prior Japanese Patent Application No. 2011-251129, filed on Nov. 16, 2011, the entire contents of which are incorporated herein by reference.

FIELD

The embodiment discussed herein is related to a communication apparatus for performing time synchronization.

BACKGROUND

Currently, the demand for time synchronization and frequency synchronization of high precision has been increasing in fields related to communication appliances, industries, AV, measurements, and automobiles, and a standards for realizing a packet-based time synchronization method is standardized by IEEE 1588.

IEEE 1588 is a standard for laying down a time synchronization protocol applicable to Ethernet. With IEEE 1588, a protocol called PTP (Precision Time Protocol) is defined. With this protocol, time synchronization is performed with an IP (Internet Protocol) packet or a MAC frame specified as an Ethernet type.

Figure 1:
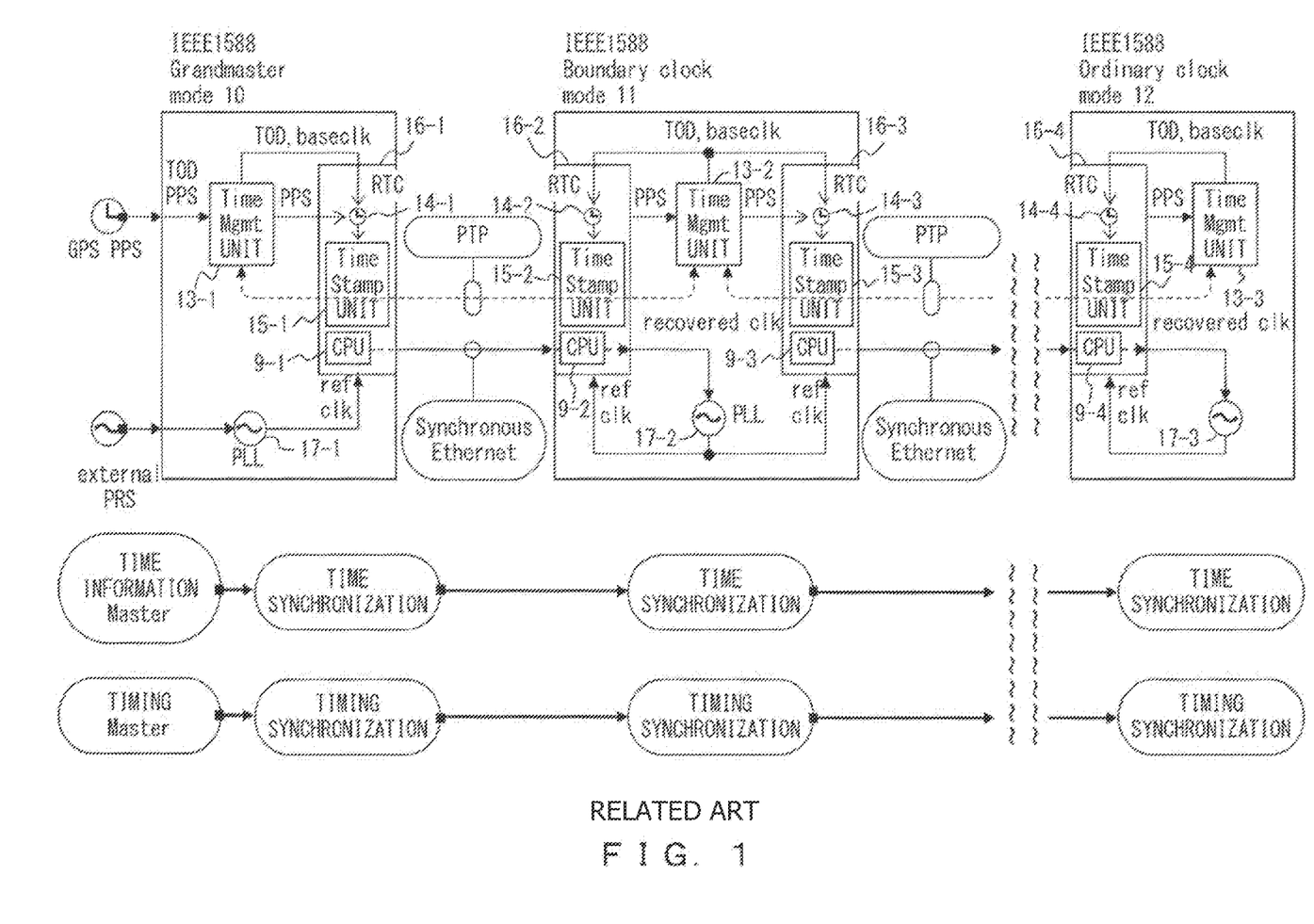
FIG. 1 illustrates a configuration and a clock configuration, which are intended for time synchronization of IEEE 1588 in a communication apparatus.

FIG. 1 illustrates a block configuration and a clock configuration, which are intended for the time synchronization of IEEE 1588 in a communication apparatus.

In a GrandMaster mode node 10, a master of time information, receives TOD (Time of Day: time information) and PPS (Pulse per Second) from a GPS (Global Positioning System) receiver, and synchronizes the local node to a standard time. The GrandMaster mode node 10 propagates time information to an adjacent Boundary clock mode node 11 with PTP via a communication line. A portion for controlling a relay of the time information is Time Management units 13-1 to 13-3. A node that relays the time information is referred to as a Boundary clock mode node, whereas a termination point node of time information propagation is referred to as an Ordinary clock mode node. All of these nodes are time-synchronized sequentially from the GrandMaster mode node.

Each of the nodes includes an RTC (Real Time Clock) 14-1 to 14-4 for performing PTP, and a Time Stamp unit 15-1 to 15-4 for time-stamping a time of a transmission/reception of a PTP packet in a line interface unit (Ethernet MAC Processing unit) 16-1 to 16-4. The nodes can be time-synchronized with clock precision of a time resolution of the Time Stamp. In conformity with IEEE 1588 PTP, time synchronization can be implemented on the order of nanoseconds as its precision.

To perform time synchronization, also an operation clock of an apparatus needs to be synchronized. A clock signal from an external oscillator (external PRS) is input to the GrandMaster mode node 10. A PLL (Phase Locked Loop) 17-1 of the GrandMaster mode node 10 generates a reference clock the timing of which is synchronized with the clock signal from the external oscillator. This reference clock is transferred to the Boundary clock mode node 11 and an Ordinary clock mode node 12 by using Synchronous Ethernet. In the Boundary clock mode node 11 and the Ordinary clock mode 12, timings are synchronized by the PLLs 17-2 and 17-3.

Time stamp added when a PTP message is generated is generated with an RTC that is operated with software by a CPU 9-1 to 9-4 that controls the line interface unit 16-1 to 16-4.

Figure 2:
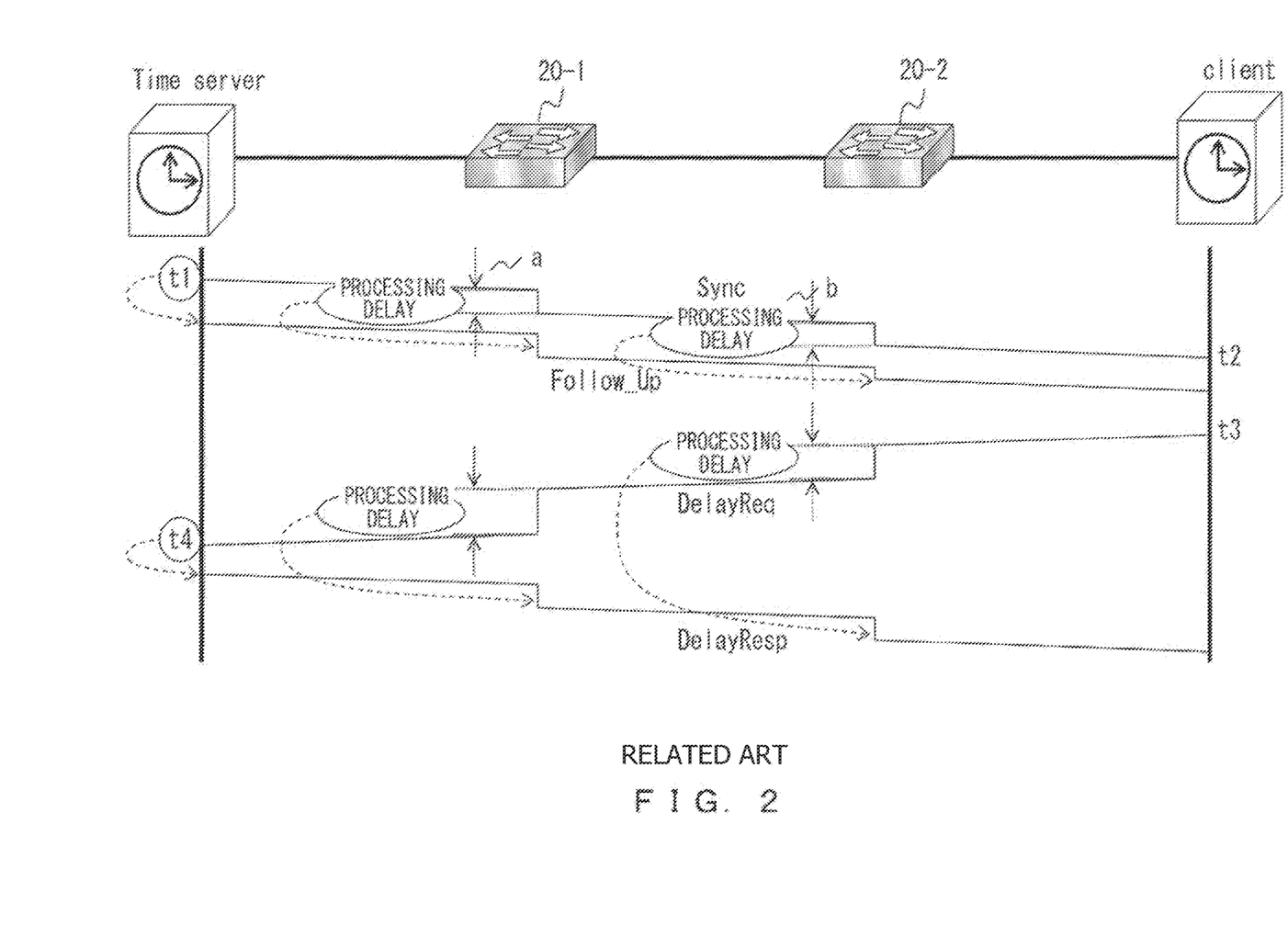
FIG. 2 is a sequence diagram illustrating procedures of the time synchronization.

FIG. 2 is a sequence diagram illustrating procedures of the time synchronization.

IEEE 1588 PTP has four types of messages such as Sync, Follow_Up, Delay_Req, and Delay_Resp. Time Stamp information set in a field of these messages are transmitted from a Time server to a Client. Finally, four time stamps t1 to t4 each including a processing delay arrive at the Client as illustrated in FIG. 2. A delay from the Time server to the Client is calculated based on these time stamps, and the Client is time-synchronized with the Time server. Specific procedures are described below.

The Time server transmits the Sync message to the Client. At this time, the Time server stores the transmission time t1 of the Sync message, and transmits Time Stamp that records t1 by using the Follow-Up message transmitted next.

Upon detection of the Sync message, each of relay nodes 20-1 and 20-2 called a Transparent clock calculates a processing delay based on a difference between a reception time and the transmission time. This processing delay is added to the Follow-Up message received next.

Upon receipt of the Sync message, the Client stores the reception time t2. Moreover, the Client extracts t1 and the processing delay from the Follow_Up message received next, and stores the t1 and the processing delay.

The Client transmits the Delay_Req message, and stores the transmission time t3.

Upon detection of the Delay_Req message, each of the relay nodes 20-1 and 20-2 called a Transparent clock calculates a processing delay based on a difference between a reception time and the transmission time. This processing delay is added to the Delay-Resp message received next in a reverse direction.

Upon receipt of the Delay_Req message, the Time server stores the reception time t4. Then, the Time server transmits a Time Stamp that represents t4 by using the Delay-Resp message transmitted next.

Upon receipt of the Delay-Resp message, the Client extracts t4 and the processing delay from the message, and stores the t4 and the processing delay.

In this way, the Client can obtain the time stamps t1 to t4 and the processing delays.

A portion excluding the processing delays of the transparent clocks in a delay between the Time server and the Client is calculated with the following equation. This simply results in a delay time of a transmission path.

$$\text{DELAY TIME OF TRANSMISSION PATH} = \frac{(t4-t1)-(t3-t2)-\text{SUM OF PROCESSING DELAY}}{2}$$

This equation represents a result obtained by dividing a result of subtracting a processing time (t3−t2) within the Client and a total of the processing delays of the relay nodes 20-1 and 20-2 on outward and return routes from a time (t4 to t1) from the transmission of the Sync message from the Time server to the Client up to the return of the Delay_Resp message by 2. The obtained result is a transmission path delay from the Time server to the Client.

By using the above described transmission path delay, t1, t2, and the processing delays of the Sync message, the amount of a correction for a time is calculated as follows.

CORRECTION AMOUNT=$t1$+TRANSMISSION DELAY+SUM OF Sync PROCESSING DELAY-$t2$

Here, the processing delays of Sync are delays of portions indicated by a and b in FIG. 2. With this equation, the transmission path delay, and the total of the transmission path delays within the relay nodes 20-1 and 20-2 are subtracted from the transmission time needed from the Time server to the Client, and a time lag between the RTC of the Time server and that of the Client is represented as the amount of a correction. This amount of a correction is used to correct the time of the RTC within the Client.

Figure 3:
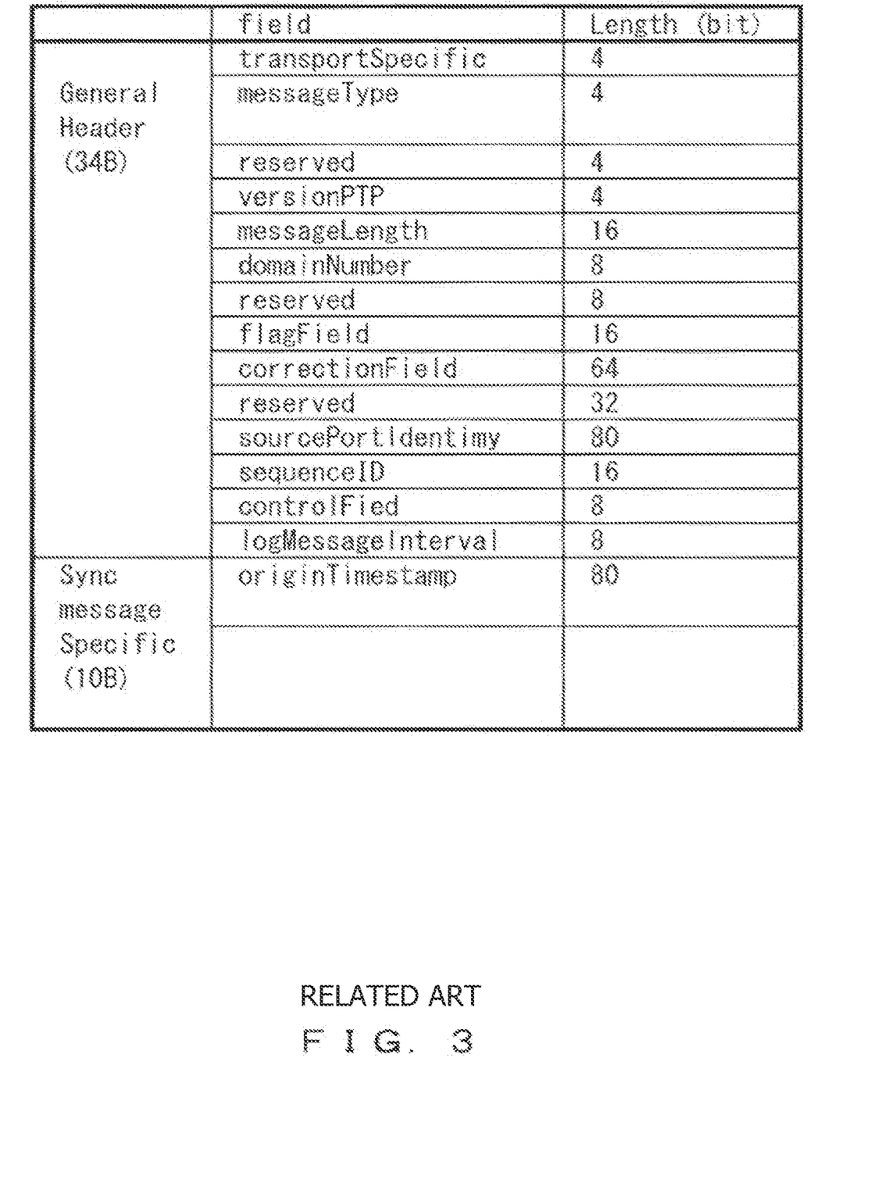
FIG. 3 illustrates fields included in a PTP message.

FIG. 3 illustrates fields included in a PTP message.

transportSpecific is a value uniquely determined dependent on hardware. messageType has a value uniquely determined depending on a message type such as Sync or the like. versionPTP is a value of portDS.versionNumber member of a dataset of a message generation node. messageLength is the number of all bits of a PTP message.

domainNumber is a value of defaultDS.domainNumber member of a dataset of an ordinary clock node that generates a message, or a boundary clock node. flagField is a flag having a meaning of each message in each of bits of two bytes. For example, 1 bit of the first byte indicates a Synch/Delay_Resp message. In corretionField, a modification value of a residence time, a transmission delay or the like is set. sourcePortIdentity indicates portDS.portIdentity member of a dataset of a message generation node. sequenceID is a value for managing a message set exchanging Time Stamp. controlField is a field prepared for compatibility with hardware for PTP version 1. logMessageInterval has a value determined depending on a message type.

originTimestamp present only in a Sync message is Time Stamp of a node that has transmitted the sync message.

Within a communication apparatus, Time Stamp of a PTP message used for time synchronization of IEEE 1588 is processed with conventional software.

Specifically, there is a field called "correctionField" for correcting a generation time of a Sync message called "Origin Time Stamp" of a PTP message. Time stamp added when a packet is generated is processed by using CLK dependent on software executed by a CPU. For a time stamp added when a packet is transmitted, its time information is updated by using an RTC (Real Time Clock) synchronized with the clock dependent on the software executed by the CPU.

Conventional techniques include a technique for performing time synchronization between a slave apparatus and a master apparatus, and a technique for performing time synchronization of high precision with a small error caused by fluctuations in a propagation delay time. The conventional techniques also include a technique for performing time synchronization between a master and a slave in a network including a path having asymmetric outward and return transmission routes, or a technique for performing time synchronization to a GPS reference time of all base stations.

PRIOR ART DOCUMENTS

Patent Documents

[Patent Document 1] Japanese Laid-Open Patent Publication No. 2010-197320
[Patent Document 2] Japanese Laid-Open Patent Publication No. 2001-36538
[Patent Document 3] Japanese Laid-Open Patent Publication No. 2009-65579
[Patent Document 4] Japanese Laid-Open Patent Publication No. 2000-23245

In recent years, there has been a tendency such that the amount of information processing (load) of a CPU further grows hereafter with an increase in the amount of information as networks are increasingly put into multiple domains. Since PTP messages are generated and processed with software and an RTC in such a situation, the amount of a correction in "correctionField" significantly fluctuates depending on a load state of a CPU. Therefore, a time synchronization system of high-precision cannot be built.

The demand for a time synchronization system of high-precision has been increasing in various business fields. Especially, in services such as a video distribution system and the like, which demand a smooth and timely communication, a frame loss caused by an error of time synchronization is a major problem for subscribers and providers.

SUMMARY

A communication apparatus in one aspect of the following embodiment is a communication apparatus for performing time synchronization between a local apparatus and other apparatuses by transmitting/receiving a packet for time synchronization. The communication apparatus includes: a first real-time clock for generating the packet for time synchronization; and a second real-time clock, time-synchronized with the first real-time clock, for obtaining a transmission time of the packet for time synchronization.

According to the following embodiment, a communication apparatus that can perform time synchronization of high precision can be provided.

The object and advantages of the invention will be realized and attained by means of the elements and combinations particularly pointed out in the claims.

It is to be understood that both the forgoing general description and the following detailed description are exemplary and explanatory and are not restrictive of the invention, as claimed.

DESCRIPTION OF EMBODIMENT

In the following embodiment, a hardware RTC time-synchronized with PPS/System Clock transmitted from a local IF unit or a monitor control unit is provided in each of a PTP (Precision Time Protocol) Packet generation unit and its transmission unit.

Namely, the RTCs are provided respectively in the PTP Packet generation unit and the PTP packet transmission unit (MAC). These RTCs are time-synchronized by a hardware operation with a PPS (Pulse Per Second)/System CLK.

With this configuration, a time stamp on the order of nanoseconds can be added when a PTP Packet is generated, and a time stamp on the order of nanoseconds can be added also when data (PTP Packet) is transmitted, whereby fluctuations in the amount of a correction in "correctionField" within a PTP packet can be suppressed as much as possible. Namely, a time needed from packet generation (or reception) up to a packet transmission to another apparatus is equivalent to the processing delay of FIG. 2, which is set in the "correctionField" of the PTP packet and transferred. This processing delay can be precisely managed on the order of nanoseconds, and accordingly, also time synchronization between apparatuses can be precisely performed. Therefore, RTCs of a Grandmaster mode node, a Boundary clock mode node, and an Ordinary clock mode node can be precisely synchronized. Since the RTCs of the PTP packet generation unit (generator) and the PTP packet transmission unit (NPU) are time-synchronized by a hardware operation, the need for using RTCs operating with software is eliminated. Accordingly, the processing amount of a CPU is decreased by an amount equivalent to the need for performing RTC operations. Additionally, since RTCs synchronized by a hardware operation are used, whereby time synchronization of high precision stable on the order of nanoseconds can be realized.

Figure 4:
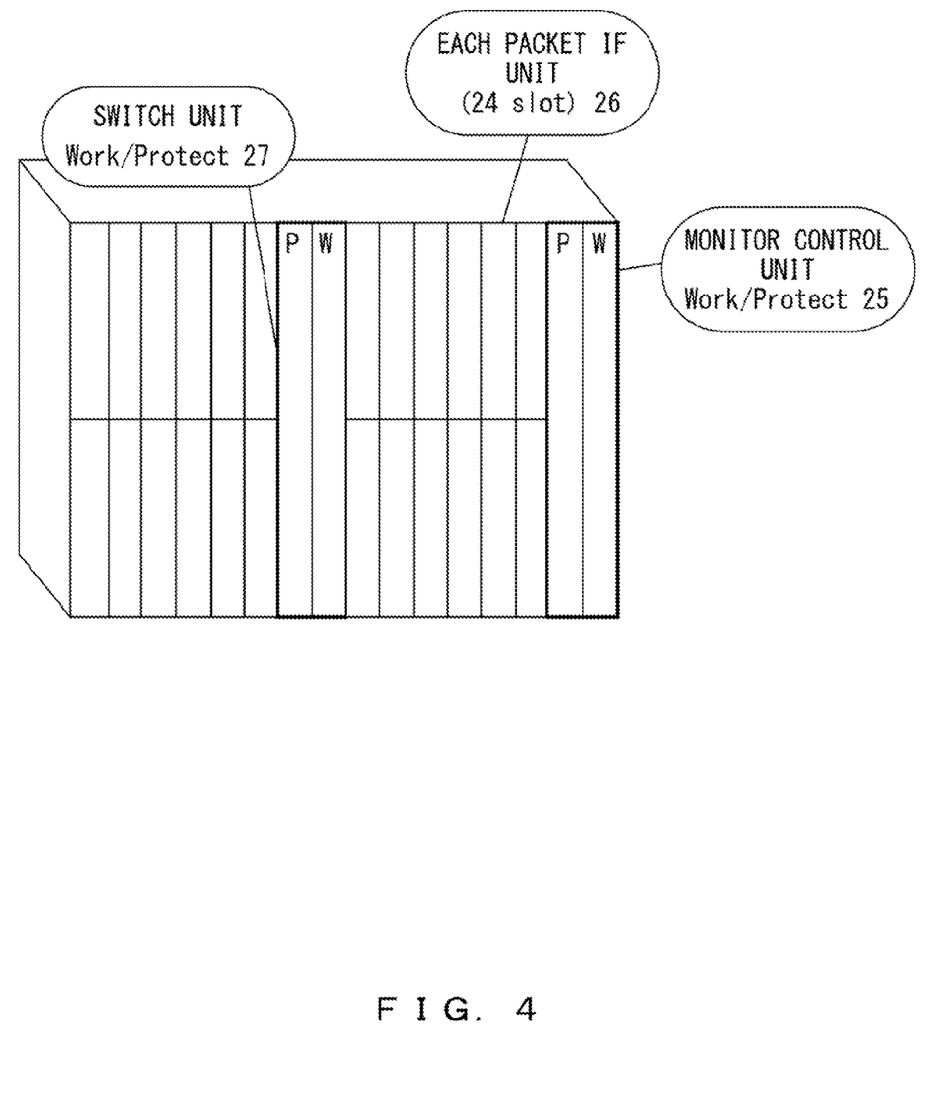
FIG. 4 is a schematic (No 1) illustrating a configuration of an embodiment.
Figure 5:
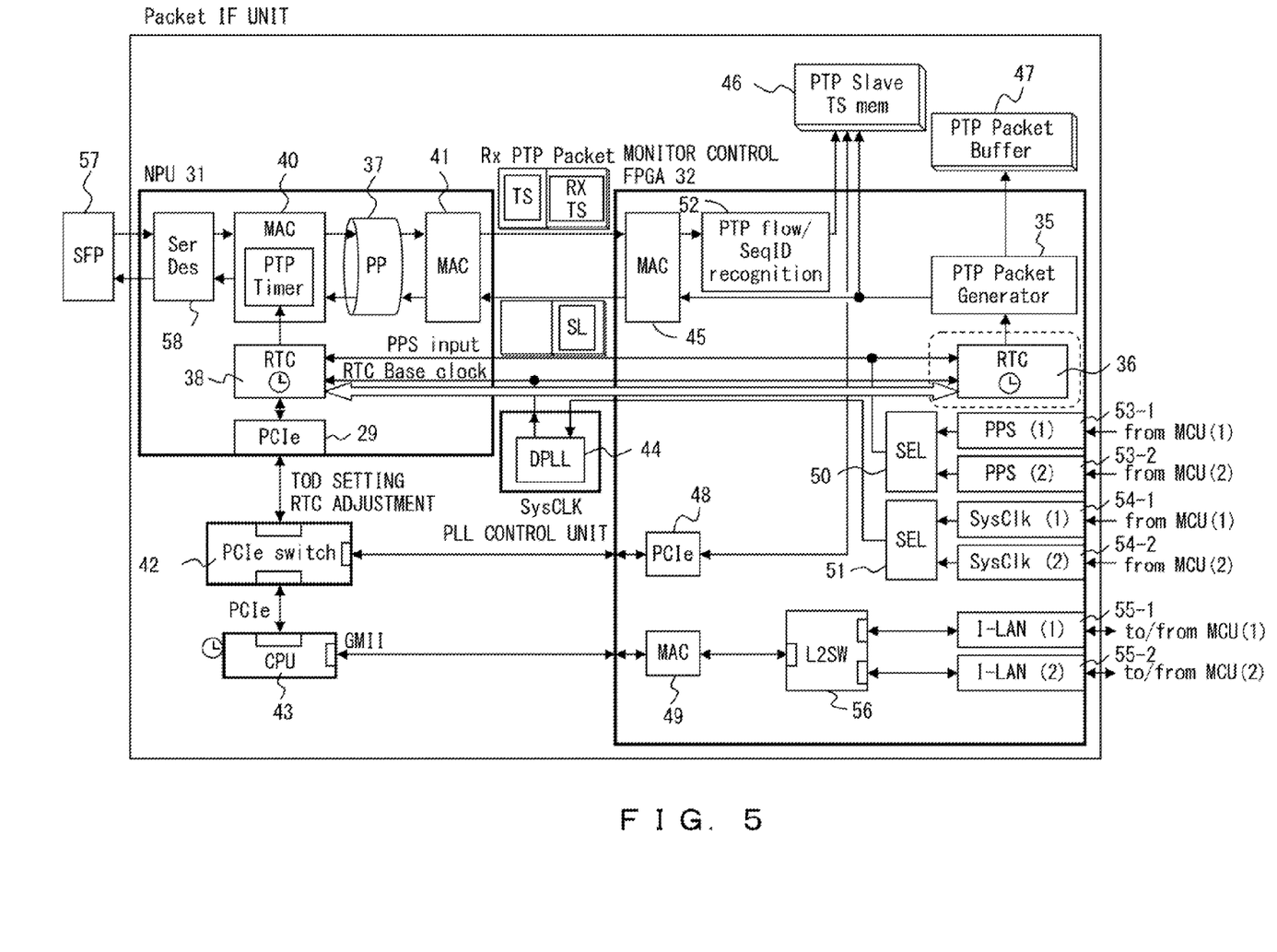
FIG. 5 is a schematic (No. 2) illustrating a configuration of the embodiment.

FIGS. 4 and 5 illustrate configurations of this embodiment.

A communication apparatus according to this embodiment is configured with a monitor control unit (MCU) 25, a Packet IF unit 26, and a switch unit 27 as illustrated in FIG. 4. Work and Protect systems are prepared respectively for the monitor control unit 25 and the switch unit 27, which are made redundant.

The monitor control unit 25 transmits System Clock and a PPS signal, which are a base of the entire apparatus, to the Packet IF unit 26.

The Packet IF unit 26 receives the PPS signal and the System Clock, which are fed from the monitor control unit 25. Based on the System Clock and the PPS signal, PTP time synchronization is performed between an RTC within a monitor control FPGA (Field Programmable Gate Array) and an RTC provided in an NPU (Network Processor Unit) within the Packet IF unit 26. In addition, the Packet IF unit 26 executes a process for a time stamp at the time of PTP Packet generation, and a process for a time stamp at the time of an external PTP Packet transmission.

FIG. 5 is a block diagram illustrating details of the Packet IF unit.

The Packet IF unit includes the NPU 31, and the monitor control FPGA 32. The monitor control FPGA 32 is provided with a PTP Packet Generator 35, and the RTC 36 time-synchronized to PPS/System Clock by a hardware operation. The NPU 31 is provided with Packet transmission units 37, 40, and the RTC 38 time-synchronized with the RTC 36 provided in the monitor control FPGA by a hardware operation.

In FIG. 5, an SFP 57 is an optical module. SerDes 58 of the NPU 31 is a serial-to-parallel conversion circuit. A MAC 40 is a MAC block including a PTP Time Stamp function, and attaches time information at the time of a packet input to a header of a PTP packet. A PP 37 is Programmable Pipeline, and is a block for executing a packet process defined by a user within the NPU 31. A MAC 41 is a transmission/reception block of a PTP packet. The RTC 38 is a time block for providing reception time information to an input PTP packet. A PCIe 29 is a PCI Express interface.

A PCIe switch 42 is a switch used for a monitor control access. A CPU 43 is a processor, included in the IF unit, for monitoring/control. The CPU 43 collects Time Stamp information of an input PTP packet, and notifies the monitor control unit (MCU) 25 of the collected information via a network. A SysCLK PLL control unit 44 is a block for generating a reference clock synchronized to SysClock selected from the work or protect system control unit.

A MAC 45 is a transmission/reception block of a PTP packet. A PTP flow/SeqID recognition 52 is a block for executing a filter process by identifying a flow/sequence number of an input PTP packet. A PTP Slave TS mem 46 is a memory for storing Time Stamp information of an input PTP packet. A PTP Packet Generator 35 is a block for controlling generation of a transmission PTP packet, and operates with a trigger self-generated by hardware. A PTP Packet Buffer 47 is a memory for storing transmission PTP packet data. The RTC 36 is a block for providing originTimestamp time information of a transmission PTP packet, and has the same time information by sharing a PPS signal and a clock with the RTC 38 of the NPU. PPS (1) 53-1 and PPS (2) 53-2 are blocks for receiving a PPS signal input from the MCUs, and receive a PPS signal from each of MCUs of work and protect systems. SysClk(1) 54-1 and SysClk(2) 54-2 are blocks for receiving a System Clock signal input from the MCU, and receive the System Clock signal from the MCUs of the work and the protect systems. SELs 50 and 51 are selectors for respectively selecting either of signals of the work and the protect systems. I-LAN(1) 55-1 and I-LAN (2) 55-2 are LAN interfaces within the apparatus, and connected to the MCUs of the work and the protect systems. An L2SW 56 is a LAN switch within the apparatus. A PCIe 48 is a PCI Express interface. A MAC 49 is a transmission/reception block of a LAN within the apparatus.

A transmission operation of a PTP packet is described.

The selector SEL 50 selects a PPS signal transmitted from the work system or the protect system of the MCU (monitor/control unit). The selector SEL 51 selects a SysClk signal transmitted from the work system or the protect system of the MCU (monitor control unit). The SysCLK PLL control unit 44 generates a clock to be used as a reference based on the SysClk signal selected by the selector SEL 51. The RTCs 36 and 38 are time-synchronized based on the PPS signal selected from the MCU, and the reference clock generated by the SysCLK PLL control unit 44. In the PTP Packet Generator 35, a PTP packet is generated by a hardware operation based on the RTC 36 synchronized with the RTC 38. Then, the generated PTP packet is stored in the PTP Packet Buffer 47. Upon receipt of an instruction to transmit a PTP packet to the PTP Packet Generator 35 from the CPU 43, the PTP packet stored in the PTP Packet Buffer 47 is output. At that time, Timestamp information of the PTP packet to be transmitted is stored in the PTP Slave TS mem 46. Then, the PTP packet is transmitted from the monitor control FPGA 32 to the NPU 31. The PP 37 of the NPU 31 pipelines the received data, and transfers the PTP packet to the MAC 40. The MAC 40 writes a time, at which the PTP packet is externally transmitted, to the originTimestamp field of the PTP packet. Here, the RTC 38 that obtains this time is time-synchronized with the RTC 36 by a hardware operation. Then, the PTP packet is externally transmitted via the SFP.

Figure 6:
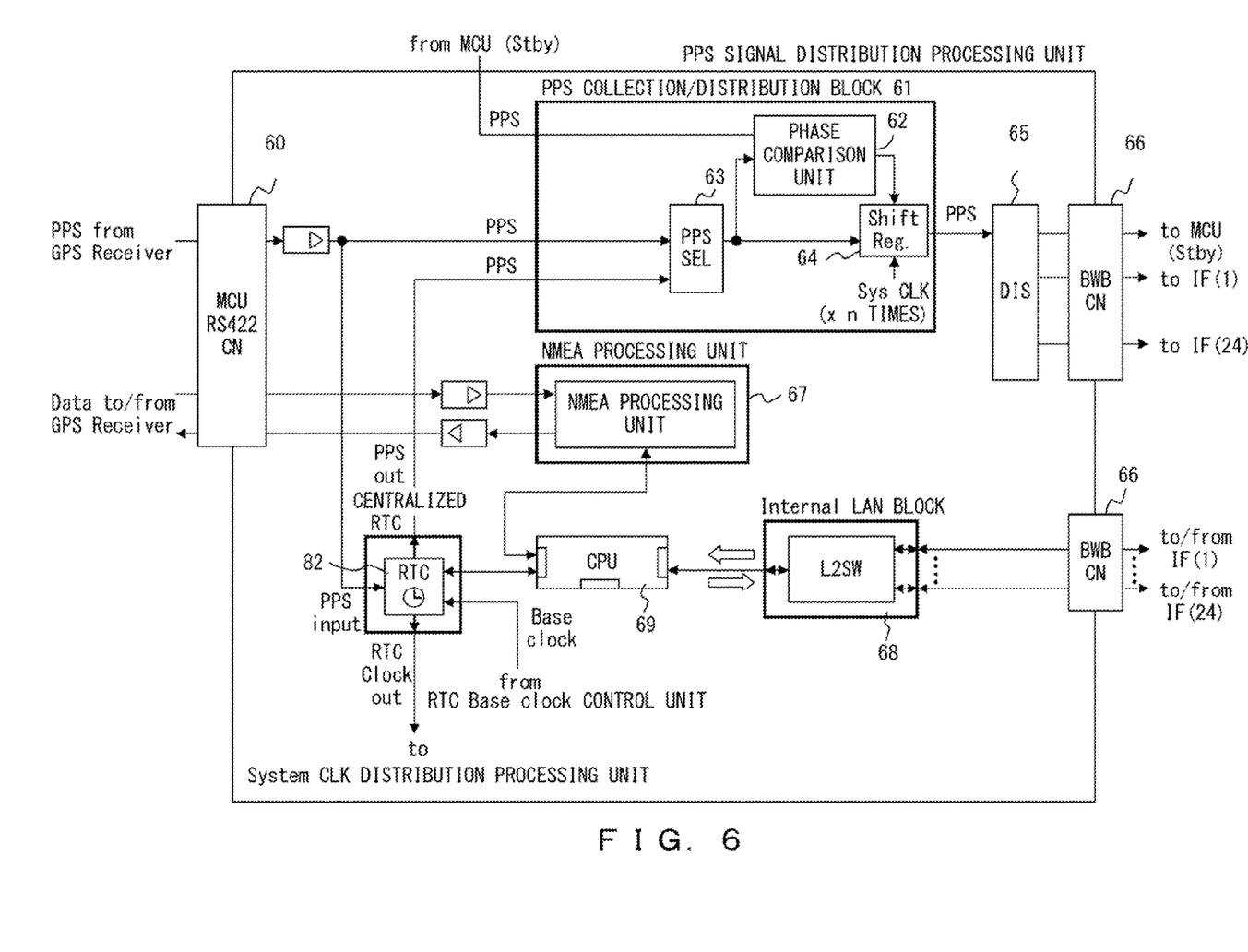
FIG. 6 is a block diagram (No. 1) illustrating details of a block configuration of a monitor control unit.
Figure 7:
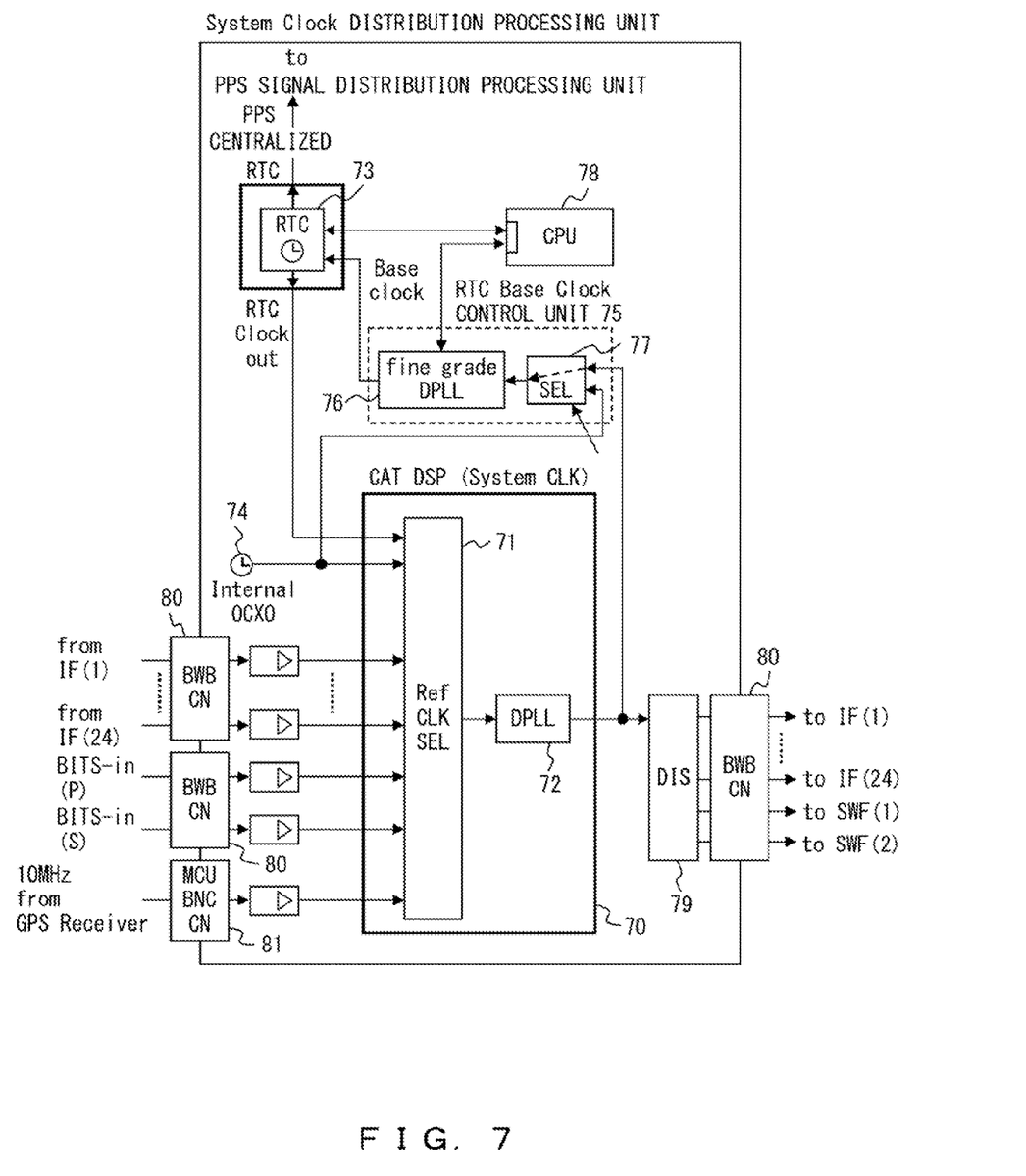
FIG. 7 is a block diagram (No. 2) illustrating details of a block configuration of the monitor control unit.

FIGS. 6 and 7 are block diagrams illustrating details of a block configuration of the monitor control unit.

The monitor control unit includes a PPS signal distribution processing unit, and a System Clock distribution processing unit. FIG. 6 illustrates a configuration of the PPS signal distribution processing unit, whereas FIG. 7 illustrates a configuration of the System Clock distribution processing unit.

In FIG. 6, an MCU RS422 CN 60 is an RS-422 connector. This is an interface connected to a GPS receiver, and receives a PPS signal, TOD information and the like. A phase comparison unit 62 of a PPS collection/distribution block 61 is a block for making a comparison between a phase of a PPS signal of a local apparatus and that of a PPS signal of a redundant apparatus. A PPS SEL 63 of the PPS collection/distribution block 61 selects, for use, either a PPS signal received from the GPS receiver or a PPS signal from the RTC 82 within the local apparatus. A Shift Reg. 64 of the PPS collection/distribution block 61 is a shift register, and controls a phase of a PPS output by using the System Clock as a reference clock. A DIS 65 is a block for distributing a PPS signal within the apparatus. A BWB CN 66 is a backboard connector, and distributes a PPS signal to a protect system MCU, and each Packet IF unit.

An NMEA processing unit 67 is a block for exchanging TOD information with the GPS receiver. A centralized RTC 82 is a block for generating original RTC time information within the apparatus. The centralized RTC 82 operates based on the System Clock as a reference, and performs a frequency control and a time control according to a software control performed with a PTP algorithm. An Internal LAN block 68 is a switch operating in Layer 2. A CPU 69 is a processor for executing the PTP algorithm based on Timestamp information collected from each IF unit.

To the MCU RS422 CN 60, a PPS signal received from the GPS receiver is input. A PPS SEL 63 selects either of the PPS signal from the GPS and the PPS signal from the centralized RTC 82. The Shift Reg. 64 controls a phase of the PPS output by using the System Clock as a reference signal. The DIS 65 distributes the PPS within the apparatus.

In FIG. 7, a Ref CLK SEL 71 of a CAT DSP 70 is a unit for selecting a clock transmitted from a centralized RTC 73, a clock from an internal oscillator 74 or a clock from each IF unit. A DPLL 72 of the CAT DSP 70 is a digital PLL for generating a clock that does not have a frequency or phase shift from the clock input from the Ref CLK SEL 71. The centralized RTC 73 is a block for generating original RTC time information within the apparatus. The centralized RTC 73 operates based on System Clock, and performs a frequency control and a time control by a software control performed with a PTP algorithm. The centralized RTC 73 is the same as the centralized RTC 82 of FIG. 6. A fine grade DPLL 76 of a RTC Base Clock control unit 75 is a digital PLL of high precision, and transmits a block as a base of the RTC 73 based on a clock input from a SEL 77. The SEL 77 of the RTC Base Clock control unit 75 is a block for selecting either of the clock from the internal oscillator 74 and that from the CAT DSP 70. A CPU 78 is a processor for executing the PTP algorithm based on Time stamp information collected from each IF unit. The CPU 78 is the same CPU as the above described CPU 69. A DIS 79 is a block for distributing a clock within the apparatus. A BWB CN 80 is a backboard connector. An MCU BNC CN 81 is a connector for receiving the clock transmitted from the GPS receiver. This clock is, for example, 10 MHz.

The Ref CLK SEL 71 selects, as a reference clock, any of the clock from the centralized RTC 73, the clock from the internal oscillator 74, the clock transmitted from each of the IF units, and the clock from the GPS receiver. The DPLL 72 generates System Clock based on the selected clock. The DIS 79 distributes the System Clock to IF units.

Figure 8:
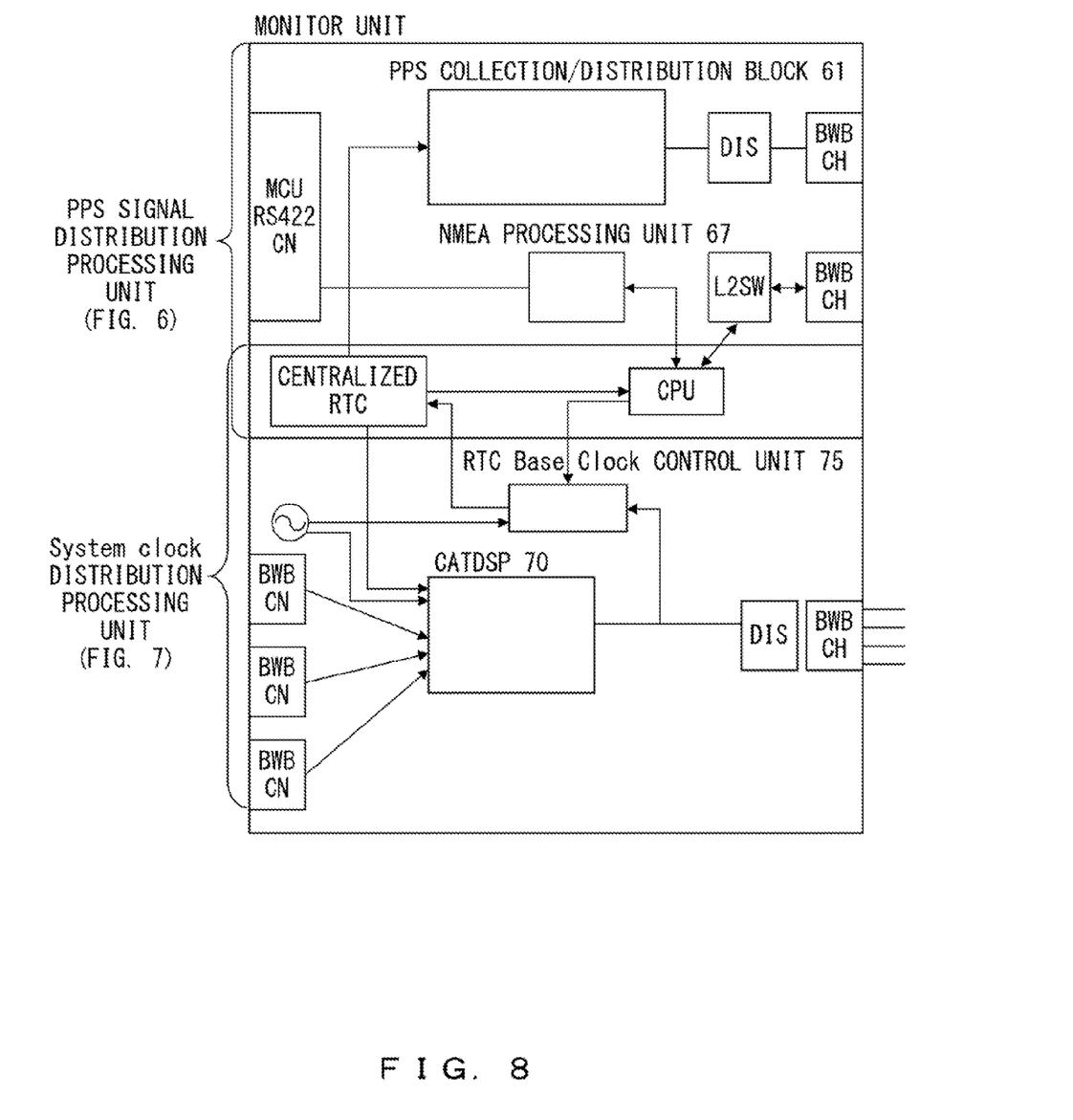
FIG. 8 illustrates the whole of the monitor control unit.

FIG. 8 illustrates the whole of the monitor control unit.

The monitor control unit has the detailed configurations described with reference to FIGS. 6 and 7. The monitor control unit has a configuration implemented by combining the PPS signal processing unit of FIG. 6 and the System Clock distribution processing unit of FIG. 7. In this case, the centralized RTC 82 of FIG. 6 and the centralized RTC 73 of FIG. 7 are the same, and the CPU 69 of FIG. 6 and the CPU 78 of FIG. 7 are the same. The centralized RTC and the CPU are common to both of the processing units.

Figure 9:
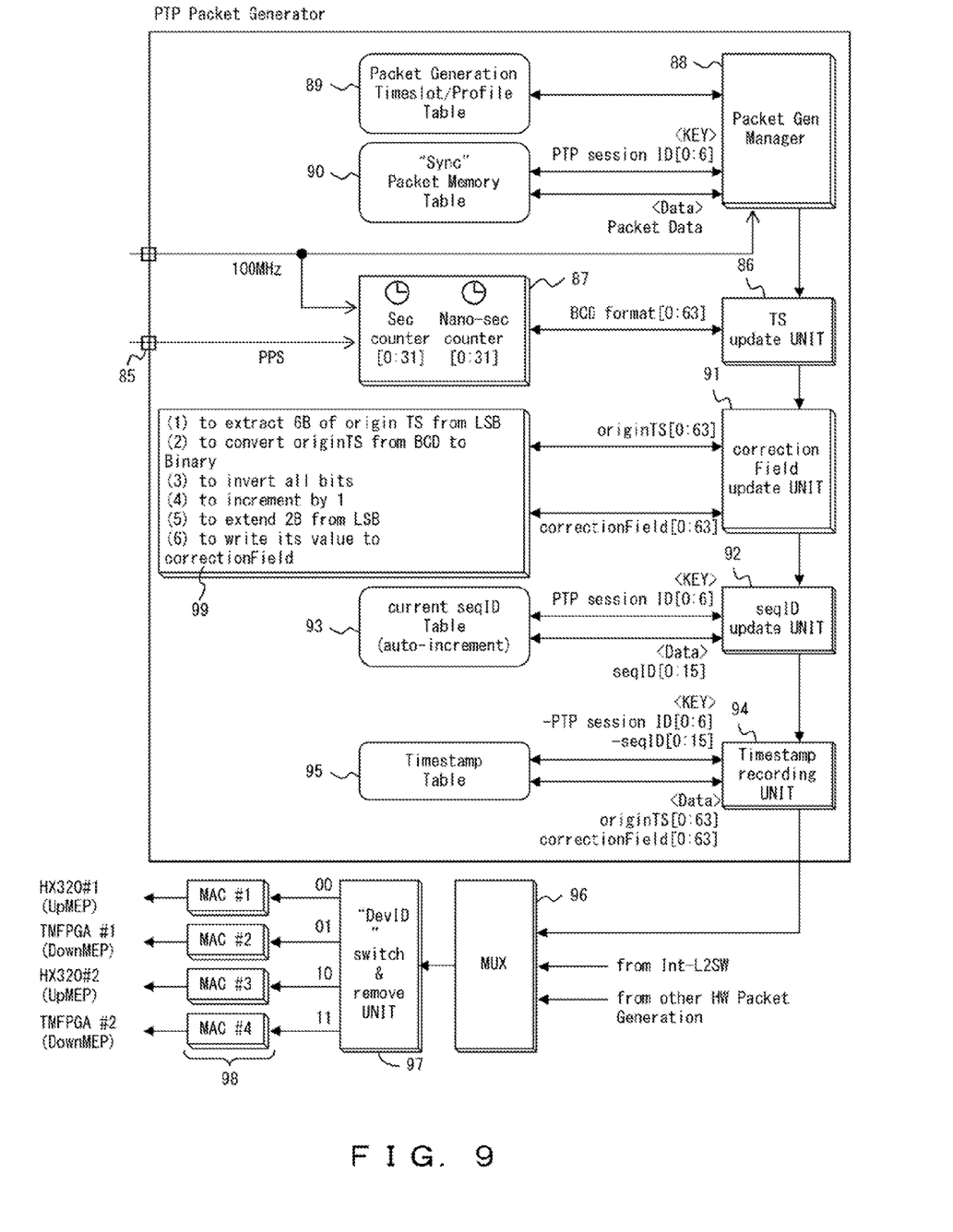
FIG. 9 is a block diagram illustrating a block configuration of a PTP Packet generator within a monitor control FPGA of a Packet IF unit.

FIG. 9 is a block diagram illustrating a block configuration of a PTP packet Generator within the monitor control FPGA of the Packet IF unit.

An RTC 87 is provided between a PPS input unit 85 and a time stamp (TS) update unit 86. The RTC 87 is provided with a counter [31:0] in units of seconds and a counter [31:0] in units of nanoseconds. The RTC 87 is time-synchronized with the RTC provided in the NPU by a hardware operation.

The PTP Packet Generator of FIG. 9 generates a Sync packet in a GrandMaster mode node. A Packet Gen Manager 88 is a Sync packet generation control block. The packet Gen Manager 88 controls generation timing based on a time slot with a trigger self-generated by hardware based on a 100-MHz reference clock. A Packet Gen Timeslot/Profile Table 89 is a table for storing Sync packet generation profile information set for each PTP session ID. A "Sync" Packet Memory Table 90 is a table for storing Sync packet data.

The Sec counter is a second counter of time information. This is a counter incremented by a PPS signal, and used for the originTimestamp information of a Sync packet. The Nanosec counter is a nanosecond counter of time information. This is a counter incremented by a 100-MHz signal and reset by a PPS signal. The Nanosec counter is used for the originTime stamp information of a Sync packet. The TS update unit 86 is a block for updating an originTimestamp area of a Sync packet to the current time information. A correctionField update unit 91 is a block for updating the correctionField area of a sync packet. A seqID update unit 92 is a block for updating a sequence ID area of a sync packet. The seqID update unit 92 updates the sequence ID area by using a sequence ID number counted by a current seqID table 93. The current seqID Table 93 is a memory for storing the current sequence ID number of a Sync packet managed for each PTP session ID, and is automatically incremented by 1 at each access. A Timestamp recording unit 94 is a block for storing the originTimestamp information and the correctionField information for each PTP session ID and sequence ID at the generation of a Sync packet. A Timestamp Table 95 is a memory for storing the originTimestamp information and the correctionField information for each PTP session ID and sequence ID. A MUX 96 executes a process for multiplexing a packet self-generated by hardware and other packets. A DevID switch&remove unit 97 is a block for switching a destination based on device ID information. The device ID information is deleted after a packet passes through this block. MAC1-4 98 is a destination of a transmission packet.

FIG. 9 assumes 4 ports. The MAC1-4 98 collects Timestamp information of an input PTP packet, and notifies the MCU of the information via a LAN.

A block 99 is configured with hardware, and executes a process for obtaining a value of the correctionField from a value of the originTimestamp. Initially, 6 bytes of 8-byte originTimestamp are extracted from LSB (Least Significant Bit). Next, originTimestamp is converted from byte code into binary data. All bits are inverted and incremented by 1, and the originTimestamp is extended from the LSB by 2 bytes. This means that the 6 bytes are extracted and processed from the 8-byte originTimestamp, and 0 is added by 2 bytes. Then, this value is written to the correctionField.

Initially, the packet Gen Manager 88 generates a Sync packet based on a 100-MHz reference clock. The TS update unit 86 updates the originTimestamp area of the Sync packet. The correctionField update unit 91 updates the correctionField area of the sync packet. The seqID update unit 92 updates the sequence ID area of the Sync packet. The Timestamp recording unit 94 stores originTimestamp information and correctionField information for each PTP session ID and sequence ID. The "DevID" switch&remove unit 97 selects a destination based on the device ID information, and outputs the packet.

Figure 10A:
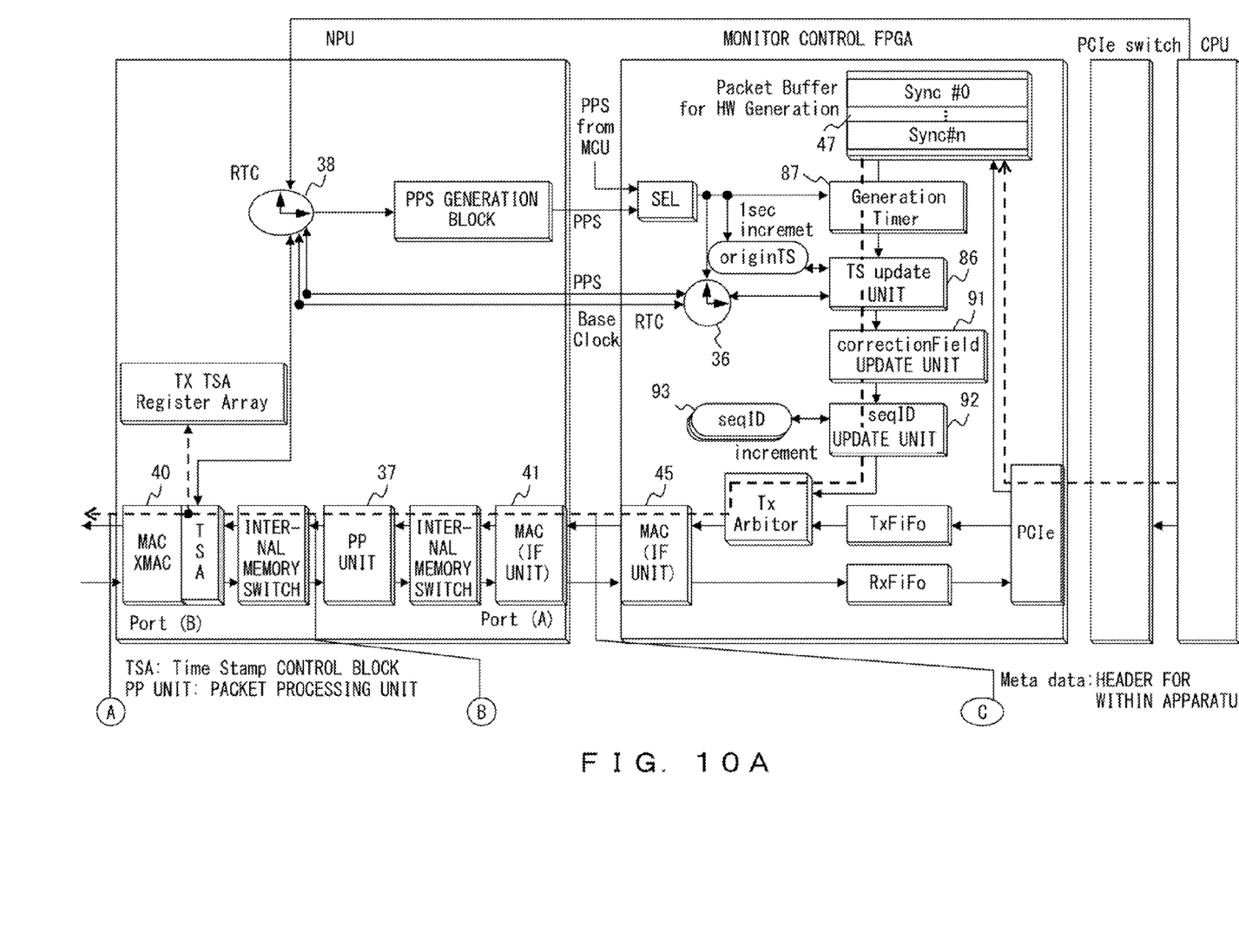
FIG. 10A is an explanatory view (No. 1) of PTP packet processing operations.
Figure 10B:
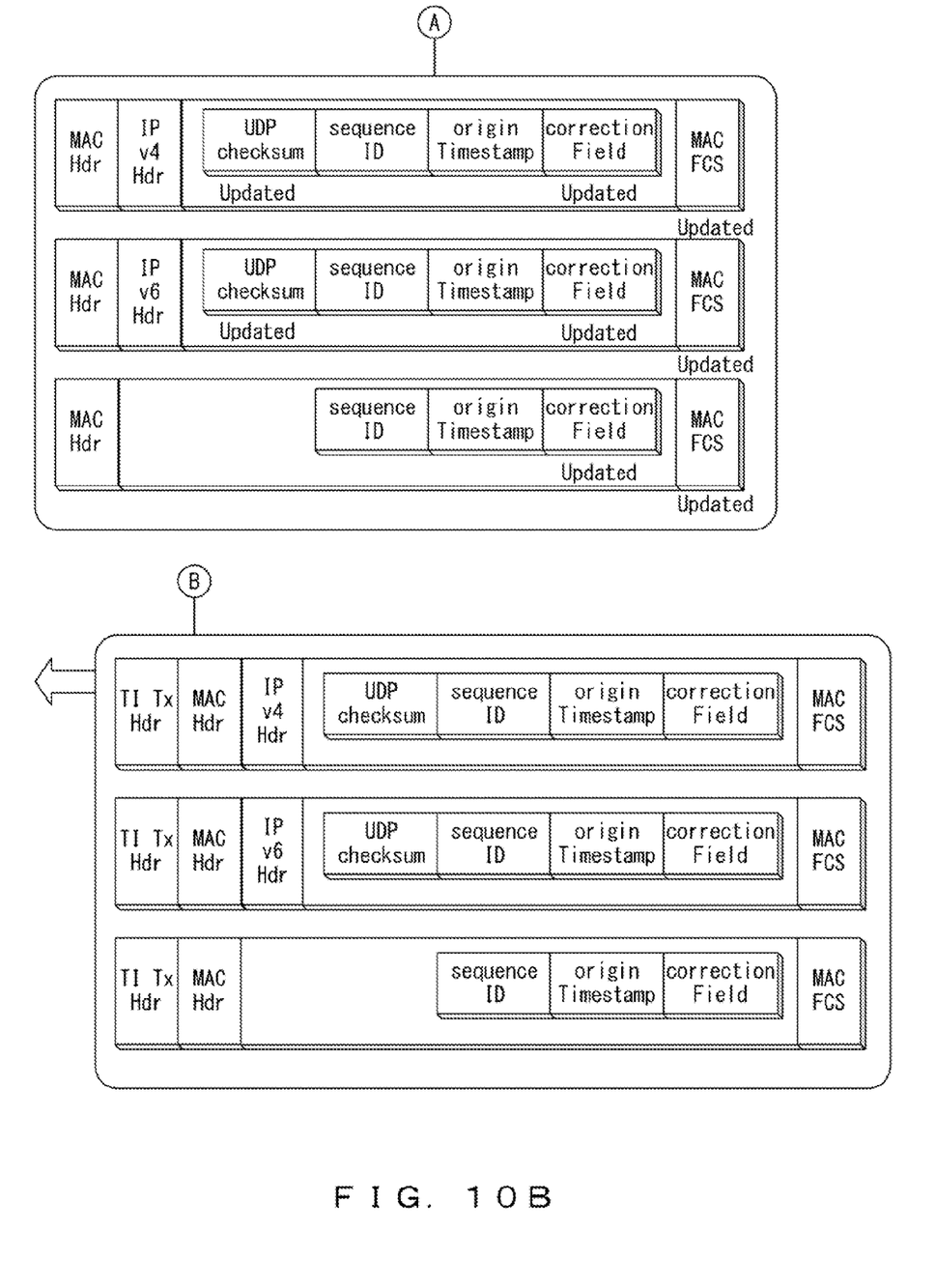
FIG. 10B is an explanatory view (No. 2) of PTP packet processing operations.
Figure 10C:
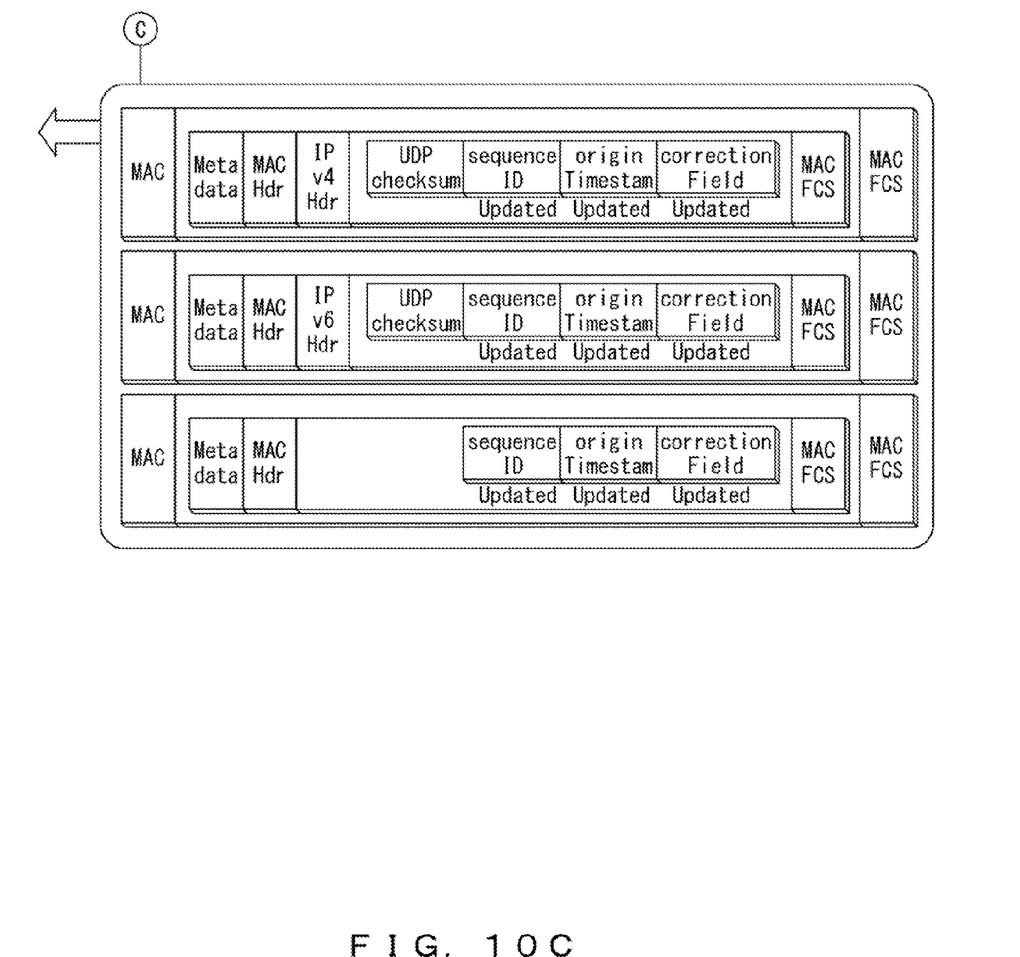
FIG. 10C is an explanatory view (No. 3) of PTP packet processing operations.

FIGS. 10A to 10C are explanatory views of PTP packet processing operations.

In FIG. 10A, the same components as those of FIGS. 5 and 9 are denoted with the same reference numerals, and their explanations are omitted.

In the PTP Packet process, a PTP message is initially written in advance from the CPU to the PTP Packet Buffer 47 within the monitor control FPGA. A PTP message generation instruction is issued from the CPU to a Packet generation control unit (not illustrated in FIG. 10A). The TS update unit 86 executes a Time Stamp process based on the RTC 36 time-synchronized with the RTC 38 of the NPU by a hardware operation. The correctionField update unit 91 updates the correctionField. The Sequence ID update unit 92 updates the sequence ID.

Data is transmitted from the MAC IF unit 45 of the monitor control FPGA to the MAC IF unit 41 of the NPU. The time stamp control unit TSA of the NPU updates the correctionField based on time information of the RTC 38 time-synchronized with the RTC 36 of the monitor control FPGA by the hardware operation. The MAC IF unit 40 of the NPU updates UDP Check SUM and FCS (Frame Check Sequence). Then, data is externally transmitted from the NPU.

FIGS. 10B and 10C illustrate frame formats of a PTP packet used in the units. The frame format in an upper portion of FIG. 10B is a format used when a packet is externally transmitted from the MAC IF unit 40 of FIG. 10A or a packet is externally received. The frame format in a lower portion of FIG. 10B is a format used when a packet is transmitted/received between the PP unit 37 of FIG. 10A and the internal memory switch. FIG. 10C illustrates a format used when a packet is transmitted/received between the MAC IF units 41 and 45.

An externally transmitted PTP packet is composed of a MAC header, an IPv4 header (IPv6 header or omissible), a UDP checksum (omissible), a sequence ID, originTimestamp, correctionField, and MAC FCS. If this packet is transferred between the MAC IF units 45 and 41, Meta data is added to the start and buried in a MAC frame, which is then transferred. If the packet is transferred within the NPU, a TI Tx header is added to the start of the PTP packet, which is then transferred.

As described above, even if a PTP packet is transferred with a different protocol, the packet is wrapped and transferred, and the sequence ID field, the originTimestamp field, and the correctionField are suitably updated based on their positions within a frame, whereby the PTP process can be executed. Positions of the sequence ID field, the originTiemstamp field, and the correctionField within a frame may be set within the header added in a transfer with an applied protocol.

As described above, the RTCs of the PTP Packet generation unit (generator) and the transmission unit (NPU) are time-synchronized by a hardware operation, whereby a time stamp on the order of nanoseconds can be added even at the time of PTP Packet generation and a data (PTP Packet) transmission. Moreover, fluctuations in the amount of a correction in the "correctionField" within a PTP packet can be suppressed as much as possible. By suppressing fluctuations in the amount of a correction in the correctionField within a PTP packet, a value of the amount of a correction for a time of the RTC can be made precise. Accordingly, since the amount of a correction becomes precise, the RTCs of the Grandmaster mode node, the Boundary clock mode node, and the Ordinary clock mode node can be precisely synchronized. The RTCs of the PTP Packet generation unit (generator) and the transmission unit (NPU) are time-synchronized by a hardware operation, thereby eliminating the need for using RTCs operating with software. Accordingly, the processing amount of a CPU (the processing amount of a correction for a time) is reduced by an amount equivalent to the need for executing RTC operations. Additionally, the RTCs synchronized by a hardware operation are used, whereby time synchronization of high-precision on the order of nanoseconds improved from the conventional order of microseconds can be performed.

IEEE 1588 PIP has the following processing mechanisms and messages.

Delay request response mechanism
Sync message
Follow_Up message
Delay_Req message
Delay_Resp message
Peer Delay mechanism
Pdelay_Req message
Pdelay_Resp message
Pdelay_Resp_Follow_UP message This embodiment is applicable to time stamp processes of all the above messages, whereby a delay measurement of the IEEE 1588 standard can be made highly precise, and a load on a CPU can be lightened.

This embodiment is also applicable not only to a wired long-haul communication apparatus but a communication apparatus of a mobile network (LTE).

Figure 11:
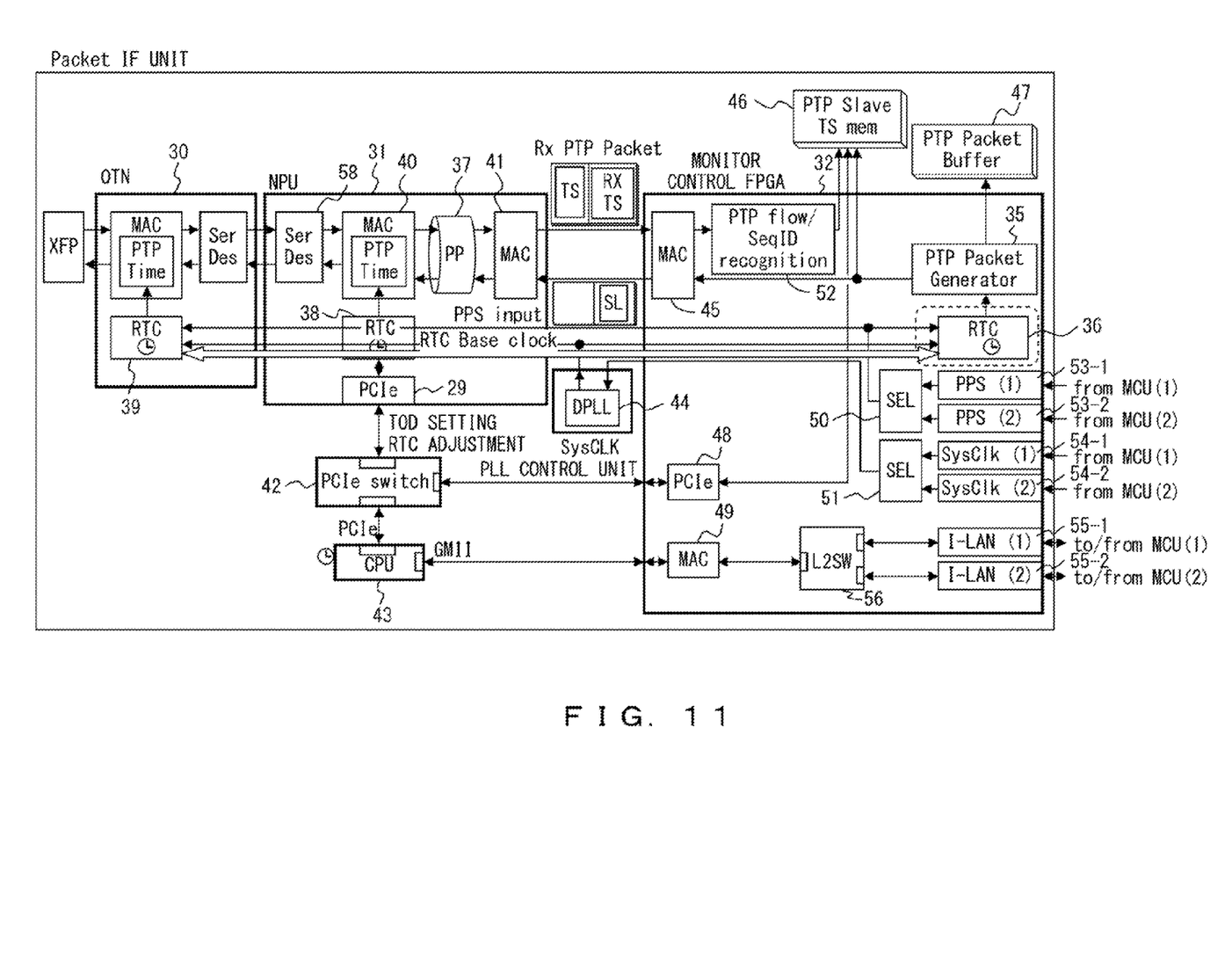
FIG. 11 illustrates a configuration example implemented by applying the embodiment to an OTN (Optical Transport Network)-PTP system.

FIG. 11 illustrates a configuration example implemented by applying this embodiment to an OTN (Optical Transport Network)-PTP system.

In FIG. 11, the same components as those of FIG. 5 are denoted with the same reference numerals, and their explanations are omitted.

In FIG. 11, an RTC on a Packet generation side and an RTC on an OTN (last transmission) side are time-synchronized by a hard operation along with an RTC of NPU. As a result, time synchronization of high precision on the order of nanoseconds can be realized also in an OTN-PTP system. At this time, the RTC 38 of the NPU 31 is not used, and the MAC 40 does not execute the Time Stamp process.

In FIG. 11, an XFP is an optical module used by 10-Gb Ethernet or the like. SerDes of the OTN 30 is a serial-to-parallel conversion circuit. A MAC of the OTN 30 is a MAC block including a PTP Timestamp function, and adds time information at the time of a PTP packet input to the header of a PTP packet. The RTC 39 is a clock block for providing reception time information to an input PTP packet.

In the configuration of FIG. 11, when a PTP packet is transmitted from the NPU 31 to the OTN 30, the MAC of the OTN 30 writes a time, at which the PTP packet is externally transmitted, to the PTP packet, and externally transmits the PTP packet via the XFP.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A communication apparatus for performing time synchronization between a local apparatus and other apparatuses by transmitting/receiving a packet for time synchronization, comprising:
    a first real-time clock to generate the packet for time synchronization;
    a second real-time clock, time-synchronized with the first real-time clock, to obtain a transmission time of the packet for time synchronization;
    an interface unit to externally transmit or receive a signal, and a monitor control unit to control the interface unit are provided in the communication apparatus, wherein the first real-time clock and the second real-time clock are provided in the interface unit; and
    a circuit to select a Pulse Per Second (PPS) signal within the interface unit or a PPS signal fed from the monitor control unit is provided,
    wherein the time synchronization between the apparatuses is performed according to a Precision Time Protocol (PTP), and
    the time synchronization between the first real-time clock and the second real-time clock is realized by a hardware operation with the use of a PPS signal and a system clock.

2. The communication apparatus according to claim 1, further comprising
    a memory to store data contents of the packet for time synchronization in a process of generating the packet for time synchronization.

3. The communication apparatus according to claim 1, wherein
    a correction time for the time-synchronization between the apparatuses is obtained by calculating a complement number of a transmission time of the packet for time synchronization after obtaining the transmission time.

4. The communication apparatus according to claim 1, wherein
    the packet for time synchronization is a PTP message, a counter value of a sequence ID is inserted in a sequence ID area, and the sequence ID within the PTP message is updated by incrementing the counter value.

5. The communication apparatus according to claim 1, wherein
    the packet for time synchronization is a PTP message, and information of an originTimestamp area can be updated by setting position information of the originTimestamp area in a frame header of a protocol for a transfer within an apparatus in a generated PTP message.

6. The communication apparatus according to claim 1, wherein
    the packet for time synchronization is a PTP message, and information of a correctionField area can be updated by setting position information of the correctionField area in a frame header of a protocol for a transfer within an apparatus in a generated PTP message.

7. The communication apparatus according to claim 1, wherein
    the packet for time synchronization is a PTP message, and information of a sequence ID area can be updated by setting position information of the sequence ID area in a frame header of a protocol for a transfer within an apparatus in a generated PTP message.

* * * * *